United States Patent [19]

Armstrong

[11] 4,160,290

[45] Jul. 3, 1979

[54] ONE-BIT MULTIFUNCTION ARITHMETIC AND LOGIC CIRCUIT

[75] Inventor: Rolfe D. Armstrong, Escondido, Calif.

[73] Assignee: NCR Corporation, Dayton, Ohio

[21] Appl. No.: 894,795

[22] Filed: Apr. 10, 1978

[51] Int. Cl.² .................. G06F 7/50; H03K 19/08
[52] U.S. Cl. ................................. 364/716; 307/207
[58] Field of Search ..................... 364/716; 307/207

[56] References Cited

U.S. PATENT DOCUMENTS

| | | | |
|---|---|---|---|
| 3,576,984 | 5/1971 | Gregg, Jr. ........................... | 364/716 |
| 3,584,207 | 6/1971 | Huddinge et al. ................... | 364/716 |
| 3,749,899 | 7/1973 | Kohoutek et al. ................... | 364/716 |
| 3,767,906 | 10/1973 | Pryor ................................. | 364/716 |

OTHER PUBLICATIONS

Machart et al., "General Function Circuit", *IBM Tech. Disclosure Bulletin*, vol. 15, No. 1, Jun. 1972, p. 11.
Bodner et al. "Eight-Bit Arithmetic & Logic Unit"*IBM Tech. Disclosure Bulletin*, vol. 17, No. 8, Jan. 1975, pp. 2402–2406.

*Primary Examiner*—David H. Malzahn
*Attorney, Agent, or Firm*—J. T. Cavender; Edward Dugas

[57] ABSTRACT

A one bit multifunction arithmetic and logic circuit is implemented with a pair of inverters, four two input NOR gates, three two-input OR/NOR gates, and two three-input NOR gates. Each of the inverters has four wire OR-able outputs, two of which are inverting and two of which are non-inverting. One input of each of the four two-input NOR gates is coupled to a respective one of four control inputs of the arithmetic and logic circuit; the other input thereof is coupled to respective ones of four wire ORed combinations of the outputs of the first and second inverters. Various outputs of the first, second, third, and fourth two-input NOR gates are wire ORed together. A first one of the three-input NOR gates is responsive to the generate signal, a carry signal, and the wired OR output of the first and second two-input NOR gates. The second three-input NOR gate is responsive to the propagate signal, a carry signal, and the "output disable" input. The first outputs of the first and second three-input NOR gates are wire ORed together to produce a first "sum" output; the second output of the first and second three-input NOR gates are wire ORed together to produce a second sum output which may be used as a wire OR-able "zero result" indicator signal.

21 Claims, 9 Drawing Figures

ONE-BIT MULTIFUNCTION ARITHMETIC AND LOGIC CIRCUIT

BACKGROUND OF THE INVENTION

1. Field of the Invention

The invention relates to circuits for performing arithmetic and logic operations.

2. Description of the Prior Art

There are a large number of multi-purpose logic circuits, including arithmetic circuits capable of selectively performing various arithmetic operations, and also including arithmetic/logic circuits capable of selectively performing a variety of both Boolean logic operations and arithmetic operations. One such circuit is the Motorola MC 10181. Other known circuits indicative of the state of the art are shown in U.S. Pat. Nos. 3,576,984; 3,584,207; 3,624,373; 3,381,117; 3,909,789; and 3,454,310.

Implementation of the known arithmetic and logic circuits in integrated circuits has resulted in substantial economies to computer manufacturers. The greatest economies have been realized for those integrated circuits, notably memory circuits, which are sufficiently adaptable to the requirements of a large number of users to become "standard" circuits which are produced in great volumes by semiconductor manufacturers, thereby resulting in very low cost per circuit. Unfortunately, arithmetic and logic circuits are not as easily "standardized" as memory circuits; different specialized computers require various implementations of arithmetic and logic circuits suitable to the specialized structure of such specialized computers. Consequently, relatively high engineering and development costs are incurred for arithmetic and logic circuits. Relatively low volumes of such arithmetic logic circuits are manufactured; hence, the costs per circuit are high.

One approach to reducing the engineering and development costs per circuit associated with development of "non-standard" integrated circuits and to increase the manufacturing volumes of such circuits has been to utilize so-called LSI (large scale integrated) "gate arrays." LSI gate arrays are integrated circuits which include a large number of un-interconnected "library functions" or logic cells on one semiconductor chip. Such LSI gate arrays are partially manufactured in large volumes up to the point of but not including providing of interconnection metalization between the many cells or library functions to implement various circuits (such as arithmetic and logic circuits). A particular specialized circuit (such as the arithmetic and logic circuit of the present invention) may then be implemented by providing the interconnections required between the available standard cells or library functions on such a partially manufactured gate array in order to provide the specialized circuit. The required interconnections are provided on the partially manufactured gate array by a "custom" manufacturing operation; this operation is much less costly than a complete design of an integrated circuit chip which implements the specialized circuit. In short, the economies of LSI technology have been achieved for the partially manufactured gate arrays and the engineering costs of the specialized circuit only increase the cost of the above-described interconnection operation.

Of course, to achieve maximum economies, it is desirable to implement the arithmetic and logic function circuit of the invention utilizing as few of the standard cells as possible, so that the remaining unused cells may be utilized to implement other circuitry also required in the computer.

The most advanced of the prior art arithmetic and logic circuits, such as the above-mentioned Motorola MC 10181, utilize emitter coupled logic (hereinafter ECL) gates which produce "wire OR-able" output and output compliment signals. A large number of ECL gates each having at least three inputs, are utilized in the closest prior art arithmetic and logic circuits. Each input of such ECL gates requires a separate bipolar input transistor. Such bipolar input transistors require an unduly large amount of semiconductor chip area, thereby increasing the cost per logic function. Further, when complex circuits are implemented in LSI gate arrays, it is undesirable to have a large number of standard gates or library functions having three or more inputs on the "standard" partially manufactured substrate, because there is a large likelihood that a number of such inputs will be unused for the particular specialized circuits to be implemented on that partially manufactured substrate. Such unused inputs represent unused, area-consuming transistors, which limit the economies potentially achievable to the computer manufacturer by use of LSI technology.

Known arithmetic and logic units which include a plurality of one-bit arithmetic and logic circuits are frequently required to provide an output which indicates whether all of the arithmetic sums are logical "zeros." In such arithmetic and logic units an additional gate is required which logically "ORs" the individual sum bits to provide a "zero result" signal.

SUMMARY OF THE INVENTION

Accordingly, it is an object of the invention to provide a semiconductor arithmetic and logic circuit which occupies a reduced amount of semiconductor chip area.

It is another object of the invention to provide a semiconductor arithmetic and logic circuit which is implemented utilizing a reduced number of logic gates and wherein the complexity of the logic gates is also reduced.

It is another object of the invention to provide a semiconductor arithmetic and logic circuit in a minimum amount of chip area in a large scale integrated circuit gate array utilizing, wherever possible, two-input logic gates and multiple output inverters and logic gates instead of logic gates having more than two inputs.

It is another object of the invention to provide a semiconductor arithmetic and logic unit having increased operating speed.

It is another object of the invention to provide a semiconductor arithmetic and logic unit which requires minimum circuitry to produce a "zero result" indication signal.

Another object of the invention is to provide an arithmetic and logic circuit which has the same or higher operating speed as known arithmetic and logic circuits, while utilizing a lesser number of logic gates than utilized in known arithmetic and logic circuits and, where possible, utilizing two-input logic gates rather than logic gates having more than two inputs.

Briefly described, and in accordance with one embodiment thereof, the invention provides a one-bit multifunction arithmetic and logic circuit capable of selectively generating a plurality of logic functions and a plurality of arithmetic functions utilizing first and second one input, four-output inverters each having two inverting wire OR-able outputs and two non-inverting wire OR-able outputs. The arithmetic and logic circuit includes first, second, third, and fourth two-input NOR gates each having a wire OR-able output and a first input responsive to a respective one of four control inputs of the arithmetic and logic circuit and a second input responsive to a respective one of four wire ORed combinations of the outputs of the first and second inverters. Each of the four two-input NOR gates has a wire OR-able output. The outputs of the first and second two-input NOR gates are wire ORed together to produce a look ahead carry signal. The outputs of the third and fourth two-input NOR gates are wire ORed together. A first two-input OR/NOR gate has an input connected to the wire ORed outputs of the first and second two-input NOR gates, and produces a "propagate" signal. A second two-input OR/NOR gate has a first input connected to the wired OR outputs of the third and fourth two-input NOR gates and produces a "generate" signal and a second input connected to an "output disable" input of the arithmetic and logic circuit. A three-input, two-output NOR gate has one input connected to the wired OR output of the first and second two-input NOR gates, another input responsive to the generate signal, and a third input responsive to a carry signal. A second three-input, two-output NOR gate has one input connected to the inverting output of the first two-input OR/NOR gate and another input responsive to the output disable input, and a third input responsive to a carry signal. A carry look-ahead circuit produces a CARRY OUT signal and a $\overline{\text{CARRY OUT}}$ signal in response to an "arithmetic/Boolean" input of the arithmetic and logic circuit, carry look-ahead signals from other arithmetic and logic circuits, and the generate signal. The various inverters, NOR gates, and OR/NOR gates are implemented utilizing emitter coupled logic circuits.

DESCRIPTION OF THE INVENTION

Figure 1:
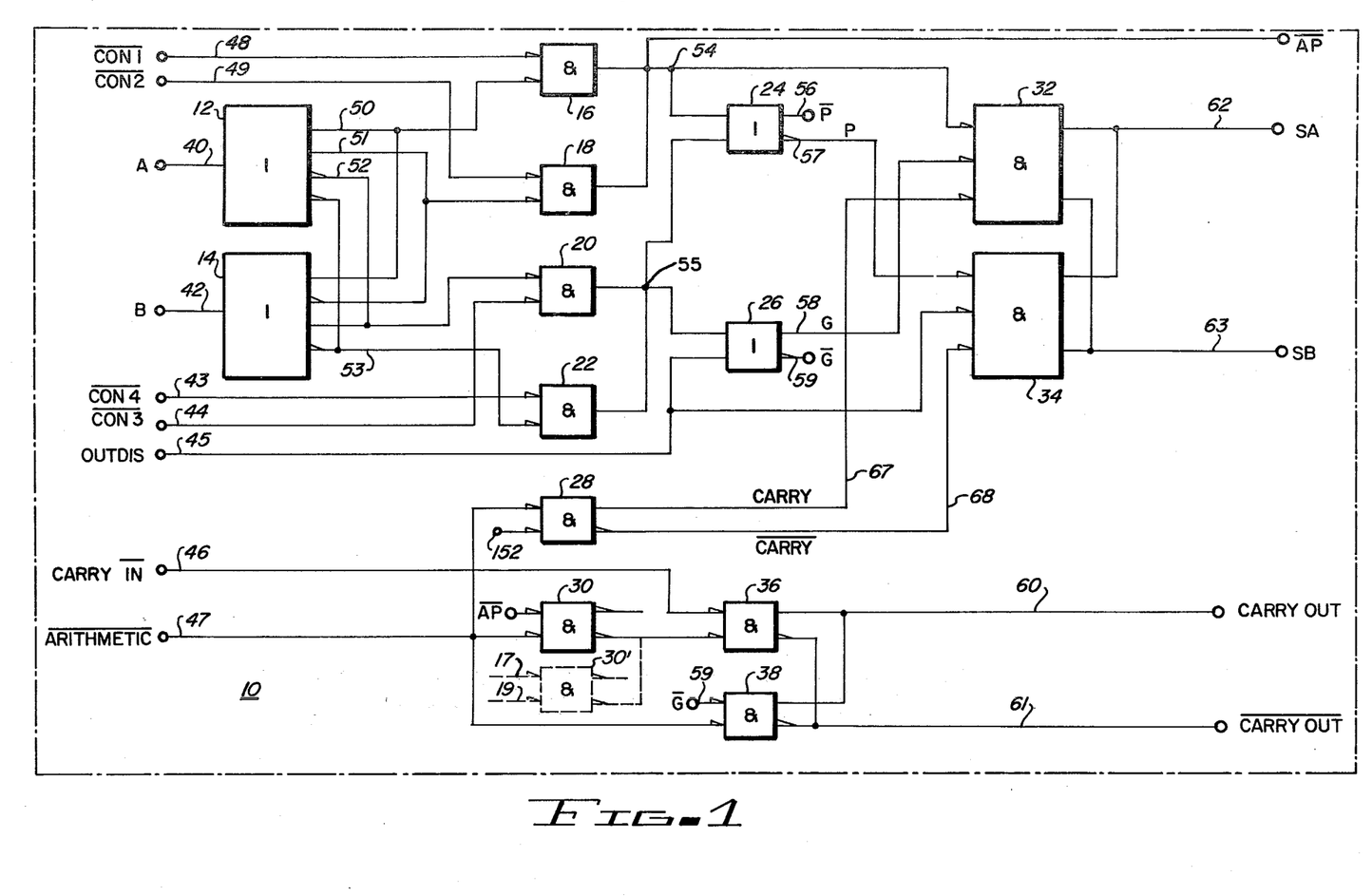
FIG. 1 is a detailed logic diagram of an arithmetic and logic circuit.

Referring to the drawings, and particularly to FIG. 1, an integrated circuit indicated by the dotted line includes a one-bit multifunction arithmetic and logic circuit 10 represented by the shown logic diagram. Arithmetic and logic circuit 10 is capable of performing the arithmetic mode operations and the Boolean logic mode operations shown in Table 1.

TABLE 1

| OPERATION SELECTION | | | | $S_A, S_B$ | |
|---|---|---|---|---|---|
| $\overline{\text{CON1}}$ | $\overline{\text{CON2}}$ | $\overline{\text{CON3}}$ | $\overline{\text{CON4}}$ | Boolean Logic Mode $\overline{\text{ARITHMETIC}} = 1$ | Arithmetic Mode $\overline{\text{ARITHMETIC}} = 0$ |
| 0 | 0 | 0 | 0 | 0 | A plus A plus carry in |
| 0 | 0 | 0 | 1 | $\overline{A} . \overline{B}$ | XXX ⎫ don't |
| 0 | 0 | 1 | 0 | $\underline{A} . \overline{B}$ | XXX ⎭ care |
| 0 | 0 | 1 | 1 | $\overline{A}$ | A minus $\overline{\text{Carry In}}$ |
| 0 | 1 | 0 | 0 | $A . \overline{B}$ | XXX |
| 0 | 1 | 0 | 1 | $\overline{B}$ | XXX |
| 0 | 1 | 1 | 0 | $A \oplus B$ | A plus B plus Carry In |
| 0 | 1 | 1 | 1 | $\overline{A} + \overline{B}$ | XXX |
| 1 | 0 | 0 | 0 | $A . B$ | XXX |
| 1 | 0 | 0 | 1 | $\overline{A \oplus B}$ | A minus B minus $\overline{\text{Carry In}}$ |
| 1 | 0 | 1 | 0 | B | XXX |
| 1 | 0 | 1 | 1 | $\overline{A} + B$ | XXX |
| 1 | 1 | 0 | 0 | A | A plus Carry In |
| 1 | 1 | 0 | 1 | $A + \overline{B}$ | XXX |
| 1 | 1 | 1 | 0 | $A + B$ | XXX |
| 1 | 1 | 1 | 1 | 1 | $\overline{\text{Carry In}}$ |

Arithmetic and logic circuit 10 includes two arithmetic/logic inputs 40 and 42, four control inputs designated by reference numerals 43, 44, 48, and 49. A logic variable designated "$\overline{\text{ARITHMETIC}}$" applied to input 47 determines whether the selected operation is an arithmetic mode operation or a Boolean logic mode operation. The control inputs 48, 49, 44, and 43 have logic variables designated by $\overline{\text{CON1}}$, $\overline{\text{CON2}}$, $\overline{\text{CON3}}$, and $\overline{\text{CON4}}$, respectively, applied thereto; these control inputs select one of the sixteen Boolean logic mode functions of Table 1 if $\overline{\text{ARITHMETIC}}$ is at a logical "1," or one of the five arithmetic functions of Table 1 if $\overline{\text{ARITHMETIC}}$ is equal to a logical zero. The functions shown in Table 1 produce the arithmetic or Boolean results on output 62 and 63, designated $S_A$ and $S_B$, respectively, and referred to as "sum" outputs. The arithmetic mode functions indicated by "XXX" in Table 1 designate "don't care" conditions on $S_A$ and $S_B$ corresponding to the indicated combinations of $\overline{\text{CON1}}$, $\overline{\text{CON2}}$, $\overline{\text{CON3}}$, and $\overline{\text{CON4}}$. Arithmetic and logic circuit 10 also includes inputs 47 and 46, which have the logic signal $\overline{\text{ARITHMETIC}}$ and $\overline{\text{CARRY IN}}$ applied respectively thereto.

Arithmetic and logic circuit 10 also provides an output designated $\overline{\text{AP}}$ at node 54; $\overline{\text{AP}}$ is utilized to accomplish a look-ahead carry function, as explained hereinafter. Another output, designated $\overline{\text{P}}$, representative of a "propagate" term, is produced at node 56 and represents a signal which may be utilized to perform a half byte look-ahead carry operation, as described hereinafter. Another output, designated $\overline{G}$ and representative of a "generate" term, is produced at node 59, and is also utilized to accomplish the look-ahead carry operation.

The above-mentioned "sum," $\overline{CARRY\ IN}$, $\overline{CARRY\ OUT}$, "propagate," and "generate" terms are conventional terms for arithmetic and logic circuits. In general, the "generate" signal of an arithmetic and logic circuit is a signal which indicates that a "carry" is being generated by that bit position. This occurs if both of the operands A and B of that bit position are logical "ones," so the generate term is given by the logic equation $G = A \cdot B$. The "propagate" signal for an arithmetic and logic circuit is a signal which indicates that a "carry in" signal applied to that bit should be propagated through that bit. This occurs if either of the operands A or B are a logical "one," so the "propagate" equation is given by the logic equation $P = A \oplus B$. The sum bit is given by the "exclusive OR" of the propagate term and the "carry in" term.

Arithmetic/logic input 40, which has arithmetic/logic variable A applied thereto, is connected to the input of four-output inverter 12, which has two "wire OR-able" non-inverting outputs 50 and 51 and also two wire OR-able inverting outputs 52 and 53. Inverter 12 is advantageously an emitter coupled logic inverter of the type shown in FIG. 2A.

Those skilled in the art will recognize that all of the outputs of the emitter coupled logic circuits shown in FIGS. 2A–2G are "wire OR-able." This means that, for logic variables defined as "positive logic" at such outputs, the outputs may be connected, i.e., "wire ORed," together; the resulting logical signal on the "wire ORed" conductors will be equal to the logical OR function of the logical variables of the outputs so connected. And, of course, for logic variables defined as negative logic at the subject outputs, "wire ANDing" is said to occur when the outputs are connected together.

Figure 2A:
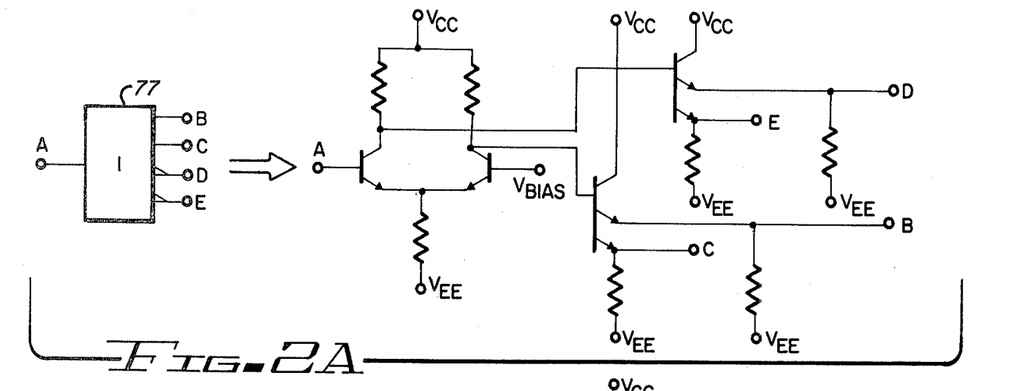
FIGS. 2A, 2B, 2C, 2D, 2E, 2F, and 2G show schematic diagrams of the logic elements utilized in FIG. 1.

Input 42, which has arithmetic/logic input variable B applied thereto, is connected to the input of inverter 14, which is also advantageously implemented by a circuit of the type of FIG. 2A. The outputs of inverters 12 and 14 are wire ORed in the four combinations shown in the drawing.

Figure 2B:
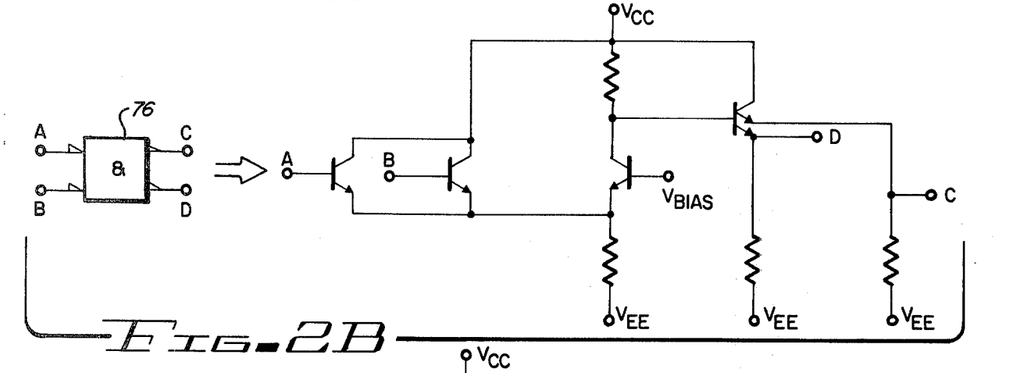
Figure 2C:
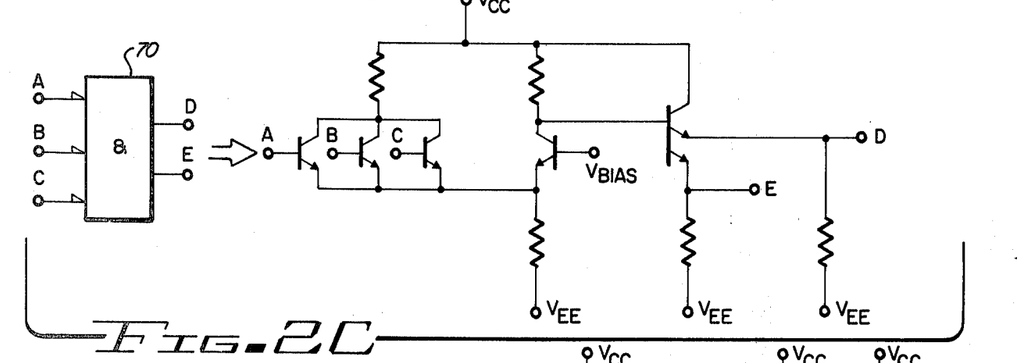
Figure 2D:
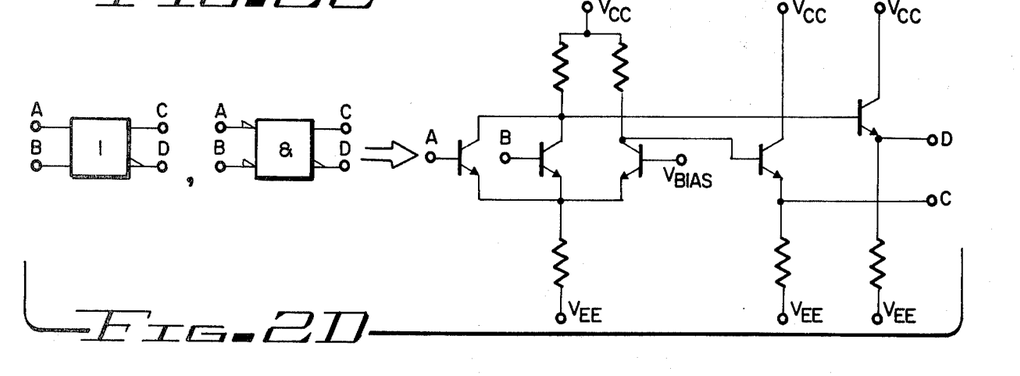
Figure 2E:
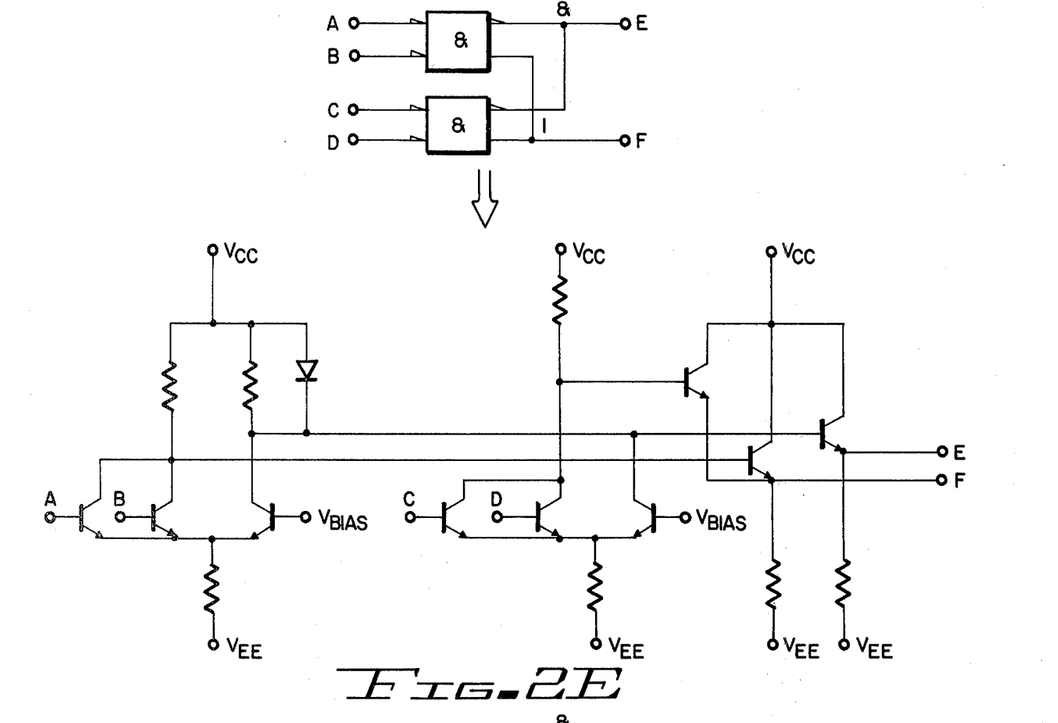
Figure 2F:
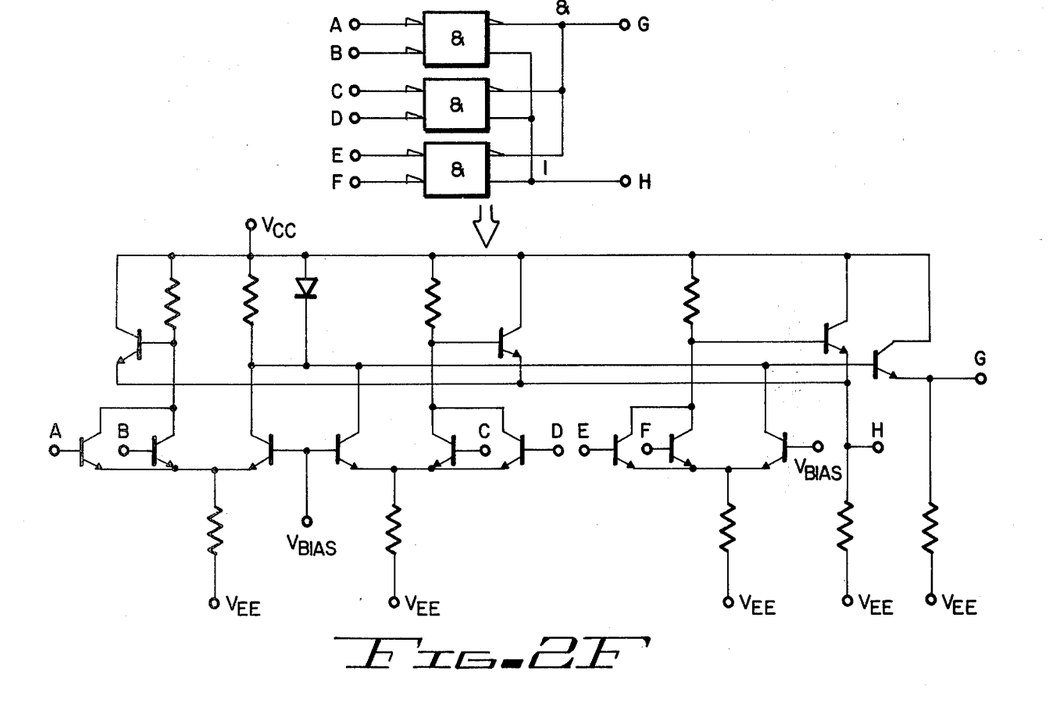

Two-input NOR gates 16, 18, 20, and 22 may be implemented by the emitter coupled logic (ECL) NOR gate shown in FIG. 2D. It should be noted that although two-input NOR gates 16, 18, 20, and 22 are implemented by logic gates which are commonly referred to as NOR gates, the symbol "&" designating a logical AND function is shown in the blocks representing these gates in FIG. 1 to illustrate the logical ANDing function that is accomplished by these NOR gates with respect to *negative* logic symbols applied to the inputs thereof. The "arrows" associated with the inputs of the logic gates in the drawings indicate that "negative logic" variables are defined at those inputs.

The convention adopted for all of the gates in FIG. 1 and FIGS. 2A–2G is that an "arrow" on an input, such as the "A" input of logic gate 76 in FIG. 2B, establishes the definition of "negative logic" at that input. In other words, a "high" voltage at input A corresponds to a logical "0" at input A, and a "low" voltage corresponds to a logical "1" at input A. Conversely, an input without an arrow, such as the "A" input of logic gate 77 in FIG. 2A, establishes the definition of "positive logic" at that input. In other words, a "high" voltage at input A of gate 77 corresponds to a logical "1" at input A thereof and a "low" voltage at that input corresponds to a logical "0" thereat. The same convention applies at the output conductors of each of the logic symbols. For example, for logic symbol 77 in FIG. 2A, the "B" and "C" outputs have "positive logic" variables defined thereat, while the "D" and "E" outputs have "negative logic" variables defined thereat. The foregoing definitions are in accordance with "De Morgan's" theorem (which states that $\overline{A+B} = \overline{A}\cdot\overline{B}$ or $\overline{A}+\overline{B} = \overline{A\cdot B}$), and the logical symbols of FIGS. 1 and 2A–2G are in accord with common usage.

The first inputs of two-input NOR gates 16, 18, 20, and 22 are connected, respectively, to control conductors 48, 49, 44, and 43. The second inputs of gates 16, 18, 20, and 22 are connected, respectively, to conductors 50, 51, 52, and 53, which are the wired OR outputs of inverters 12 and 14. The outputs of two-input NOR gates 16 and 18 are "wire ORed" at node 54 to produce signal $\overline{AP}$. $\overline{AP}$ is used to produce the sum outputs $S_A$ and $S_B$, the propagate signals P and $\overline{P}$, and $\overline{CARRY\ OUT}$ at node 61.

The outputs of two-input NOR gates 20 and 22 are wire ORed together at node 55 to produce a logical signal which is utilized to produce the sum, propagate, and carry out signals.

Two-input OR/NOR gate 24 has one input connected to node 54 and another input connected to node 55, and produces propagate term P on output 56, which may be utilized to generate a half byte look-ahead carry signal. Propagate term $\overline{P}$ is produced at inverting output 57 of OR/NOR gate 24.

Two-input OR/NOR gate 26 has one input connected to node 55 and produces generate terms G and $\overline{G}$ at nodes 58 and 59, respectively. The other input of OR/NOR gate 26 is connected to input 45, which has an "output disable" signal, designated OUTDIS, applied thereto. The OUTDIS input is utilized to force logical "zeros" at sum outputs 62 and 63 in order to facilitate testing of multi-bit arithmetic logic units including a plurality of one bit arithmetic and logic circuits such as the one shown in FIG. 1. Two-input OR/NOR gates 24 and 26 can be implemented using the circuit of FIG. 2D.

Three-input, two-output NOR gates 32 and 34 cooperate to produce an exclusive ORing of the $\overline{CARRY}$ signal (described below) applied to node 68, the $\overline{AP}$ signal at node 54, the P (propagate) signal at node 57, and the G (generate) signal at node 58. The first, second, and third inputs of three-input, two-output NOR gate 32 are connected, respectively, to nodes 54, 58, and 67, respectively. The three inputs of three-input, two-output NOR gate 34 are connected, respectively, to nodes 57, 45, and 68. The two outputs of each of NOR gates 32 and 34 are, respectively, exclusive ORed with each other at nodes 62 and 63 to produce "sum" outputs $S_A$ and $S_B$. The output disable signal OUTDIS at node 45 operates to disable $S_A$ and $S_B$ by producing logical zeros thereat when a logical "one" is applied to node 45. Nodes 67 and 68 have signals thereon designated CARRY and $\overline{CARRY}$, which are produced by OR/NOR gate 28 in response to the $\overline{CARRY\ IN}$ signal applied to input 46 and the $\overline{ARITHMETIC}$ signal applied to input 47. Two-input OR/NOR gate 28 has one input connected to input 152 and the other connected to input 47. Three-input, two-output NOR gates 32 and 34 can be implemented using the circuit 70 shown in FIG. 2C.

The look-ahead carry circuitry associated with arithmetic and logic circuit 10 includes two-input OR gates 30, 36, and 38. OR gate 30 has one input connected to the $\overline{\text{ARITHMETIC}}$ input 47 and another connected to node 54, which has the above-described look-ahead carry signal $\overline{\text{AP}}$ applied thereto.

When a logical "zero" is applied to input 47, the logical variable $\overline{\text{ARITHMETIC}}$ is equal to a logical "zero," and therefore the logical variable ARITHMETIC is equal to a logical "one," so the "Arithmetic Mode" functions in Table 1 are selected by the control inputs $\overline{\text{CON1}}$–$\overline{\text{CON4}}$ shown in Table 1, and the results appear at the sum outputs $S_A$ and $S_B$. Conversely, if a logical "one" is applied to input 47, the "Boolean Mode" functions of Table 1 are selected by the control inputs $\overline{\text{CON1}}$–$\overline{\text{CON4}}$, and the results appear at the sum outputs $S_A$ and $S_B$.

Figure 2G:
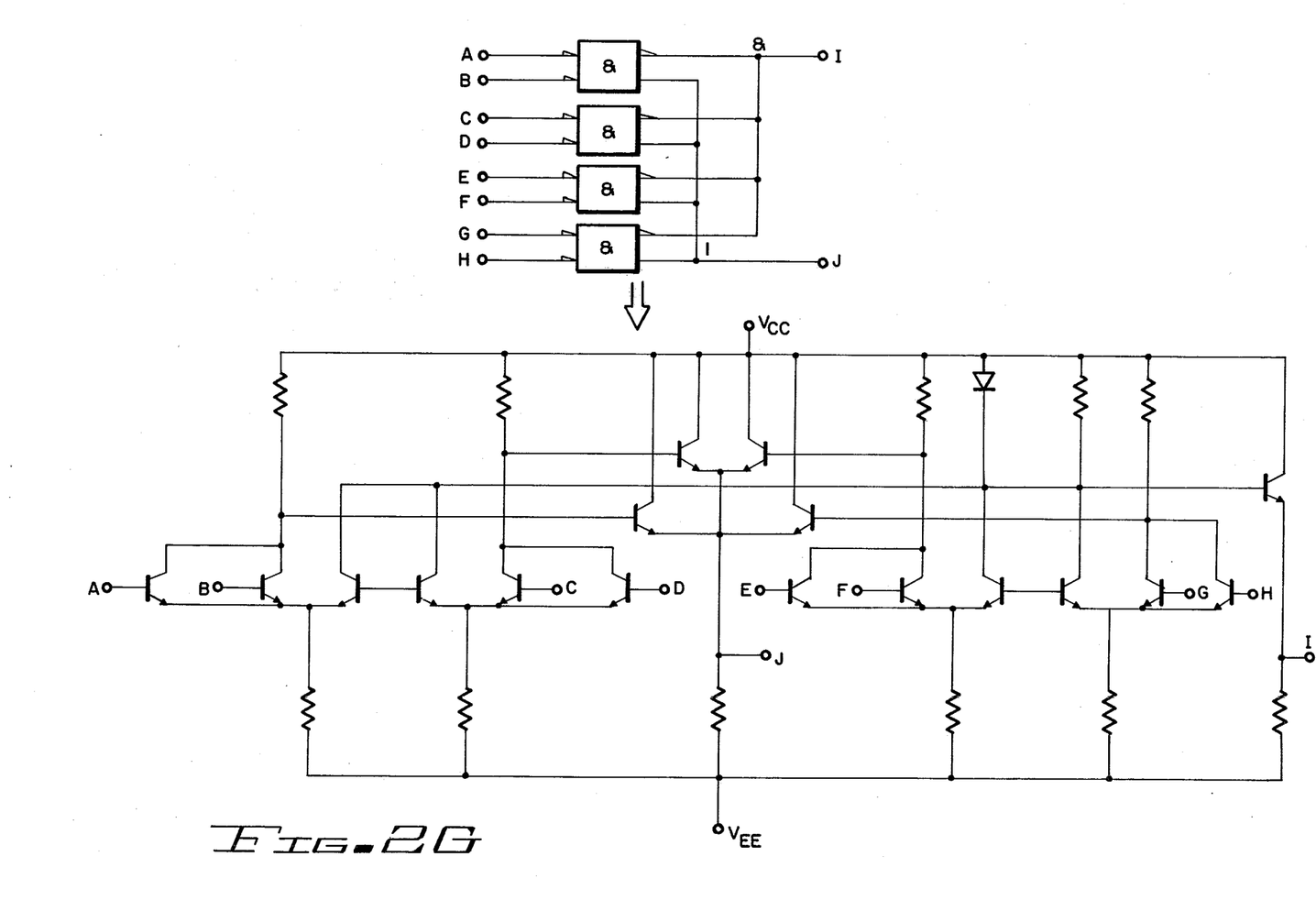
Figure 3:
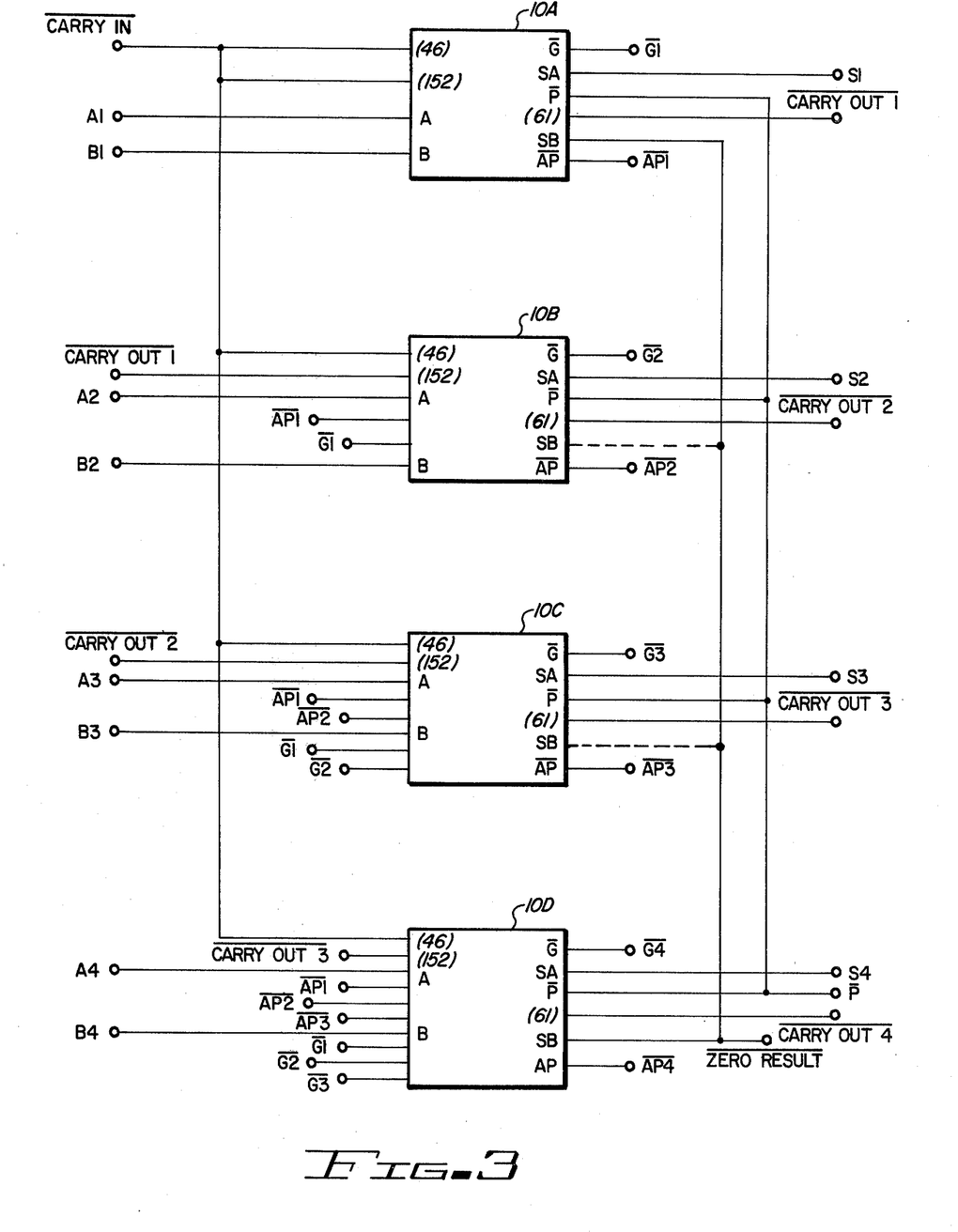
FIG. 3 shows the interconnection of four of the arithmetic and logic circuits of FIG. 1 to provide a four-bit arithmetic and logic unit.

If a number of arithmetic and logic circuits such as the one in FIG. 1 are connected to form a multiple bit arithmetic and logic unit as shown in FIG. 3, additional two-input OR gates such as 30', indicated by dotted lines in FIG. 1, may be utilized and wire ORed with OR gate 30. The circuit of FIG. 2B is utilized to implement gates 30 and 30'. The $\overline{\text{AP}}$ inputs from successive one-bit arithmetic and logic circuits are connected to the additional inputs such as 17 and 19 of additional OR gates such as 30'. In this case, the CARRY OUT signal on node 60 and $\overline{\text{CARRY OUT}}$ signal on node 61 represent look-ahead carry signals. The $\overline{\text{CARRY OUT}}$ signal of each stage is connected to the input 152 of gate 28 of the successive one bit arithmetic and logic circuit. FIG. 3 shows a connection of four of the arithmetic and logic circuits 10 of FIG. 1, designated 10A, 10B, 10C, and 10D connected to provide look-ahead carry. In order to implement the four arithmetic and logic circuits connected as shown in FIG. 3, the $\overline{\text{CARRY IN}}$ input for the entire group of four circuits is connected to node 46 of each of the arithmetic and logic circuits 10A–10D of FIG. 3. For the first bit (circuit 10A), the pair of logic gates 36 and 38 are implemented utilizing the circuit shown in FIG. 2E wherein logical wire ANDing occurs at the E output, as indicated by the "&" symbol at the E output. For block 10B of FIG. 3, gates 36 and 38 of FIG. 1 are together implemented by the circuit of FIG. 2F, wherein logical wire ANDing is accomplished at the G output. For block 10C of FIG. 3, logic gates 36 and 38 are together implemented by means of the circuit shown in FIG. 2G, where logical wire ANDing is accomplished at the I output. For the block 10D of FIG. 3, logic elements 36 and 38 are implemented utilizing two levels of logic involving the circuit of FIG. 2G for the first level and the circuit of FIG. 2E for the second level. For the first level, the A input is connected to $\overline{\text{G1}}$, (which, as shown in block 10A of FIG. 3, is the $\overline{\text{G}}$ output 59 of the arithmetic and logic circuit of FIG. 1); the B input is connected to the wire ORed outputs $\overline{\text{AP2}}$, $\overline{\text{AP3}}$, and $\overline{\text{AP4}}$; the C input is connected to $\overline{\text{G2}}$; the D input is connected to the wire ORed outputs $\overline{\text{AP3}}$ and $\overline{\text{AP4}}$; the E input is connected to $\overline{\text{G3}}$; the F input is connected to $\overline{\text{AP4}}$; the G input is connected to $\overline{\text{G4}}$; the I output of the circuit of FIG. 2G is utilized for the first level to produce $\overline{\text{CARRY OUT 4}}$ as explained below; (the H input is unused). The second level of logic mentioned above, has its A input connected to $\overline{\text{CARRY OUT 4}}$; its C input is connected to the wire OR of the P (node 56) outputs of each of the fourth arithmetic and logic circuits of FIG. 3; the D input (of the second level logic circuit) is connected to $\overline{\text{CARRY}}$ (node 68) of arithmetic and logic circuit 10A of FIG. 3; the output E produces a signal called $\overline{\text{CARRY OUT 4}}$ on node 61 of circuit 10D. The F output produces the signal CARRY OUT 4 on node 60 of circuit 10D. These two signals represent the look ahead "carry out" output for the entire four bit group of arithmetic and logic circuits 10A–10D shown in FIG. 3.

The arithmetic and logic circuit of FIG. 1 provides several advantages over the closest known prior art. First, NOR gates 16, 18, 20 and 22 are two-input gates, as opposed to the three-input gates utilized to perform an analogous function in the closest prior art. The use of such two-input NOR gates saves one input transistor for each of these gates, as is readily apparent from FIGS. 2B and 2C. This advantage is achieved at the expense of the requirement that each of inverters 12 and 14 have an additional non-inverting output and an additional inverting output. However, such additional outputs are accomplished merely by adding additional emitters to the emitter follower output transistors, as is readily apparent from the circuit schematic of FIG. 2A. Those skilled in the art will recognize that addition of an additional output emitter to an integrated circuit transistor requires far less semiconductor chip area than addition of an entire input transistor, because addition of additional emitter requires only that the base region, collector region, and surrounding isolation region be slightly enlarged to accommodate the additional emitter. Addition of an entire transistor requires provision of an additional isolation region, an additional collector region, an additional base region, and an additional emitter region. This takes up at least five to ten times as much semiconductor chip area as merely adding an additional output emitter to an already existing output transistor.

Another advantage of the circuit of FIG. 1 is that two sum outputs $S_A$ and $S_B$ are provided. The $S_A$ output can be utilized as the sum output for that bit position, while the $S_B$ output, which has the same information as the $S_A$ output, may be wire ORed with other $S_B$ outputs to provide a "zero result" indication, which may be required in a multi-bit arithmetic logic unit, but which is ordinarily produced by means of an additional multi-input gate which logically "ORs" internal signals generated by each of the one-bit arithmetic and logic circuits to produce a "zero result" indicator. Another advantage of the circuit of FIG. 1 is that the "generate" terms are produced by means of a single two-input OR/NOR gate, whereas the closest prior art requires two three-input OR/NOR gates to produce the "generate" terms.

Finally, although the number of gate delays for the arithmetic and logic circuit of FIG. 1 is the same as for the closest prior art, the speed is increased, because each of the outputs of inverters 12 and 14 drives only one gate input, whereas each output of the input inverters of the closest prior art is required to drive several gate inputs, since three-input gates are utilized by the prior art in place of two-input gates 16, 18, 20, and 22 of FIG. 1.

In summary, it is seen that the circuit of FIG. 1 is readily adaptable to implementation in LSI "gate arrays," and requires fewer logic gates then the known arithmetic and logic circuits, and the required logic gates are less complex and occupy less semiconductor chip area. Finally, a higher speed configuration of gates is accomplished by the arithmetic and logic circuit of the invention by reducing the fan-out of the input inverters.

I claim:

1. An arithmetic circuit having first and second arithmetic inputs, a plurality of control inputs, and a carry in input, said arithmetic circuit comprising:
   (a) first and second inverting means responsive to the arithmetic inputs for producing a plurality of wire OR-able inverting outputs and non-inverting outputs;
   (b) first, second, third, and fourth two-input NOR gates each having a wire OR-able output and a first input responsive to a respective one of the control inputs and a second input responsive to respective ones of the plurality of wire OR-able inverting outputs and non-inverting outputs of said first and second inverting means;
   (c) first means responsive to the wire OR-able outputs of said first and second two-input NOR gates and said third and fourth two-input NOR gates for producing a propagate signal and a generate signal respectively; and
   (d) second means responsive to a carry signal, to said propagate signal, to said generate signal, and to the output of said first two-input NOR gate for producing a sum output.

2. The arithmetic circuit of claim 1 wherein said first and second inverting means each include an emitter coupled logic inverter having first and second non-inverting outputs and first and second inverting outputs thereof.

3. The arithmetic circuit of claim 2 wherein said first and second non-inverting outputs and said first and second inverting outputs of said first emitter coupled logic inverter are wire ORed, respectively, to said first non-inverting output, said first inverting output, said second non-inverting output, and said second inverting output of said second emitter coupled logic inverter.

4. The arithmetic circuit of claim 3 wherein the outputs of said first and second two-input NOR gates are wire ORed together and wherein the outputs of said third and fourth two-input NOR gates are wire ORed together.

5. The arithmetic circuit of claim 4 further including an output disable input for producing a "zero" level at said sum output, wherein said first means includes a first two-input OR/NOR gate having a first input coupled to said wired OR outputs of said first and second two-input NOR gates and a second input coupled to said wired OR outputs of said third and fourth two-input NOR gates for producing said propagate signal.

6. The arithmetic circuit of claim 5 wherein said first means includes a second two-input OR/NOR gate having a first input coupled to said wired OR outputs of said third and fourth two-input NOR gates and a second input coupled to said output disable input.

7. The arithmetic circuit of claim 6 wherein said second means produces a second sum output and further including an arithmetic and control input and a third two-input OR/NOR gate responsive to a carry signal and the arithmetic control input, wherein said second means includes a first three-input NOR gate having first and second wire OR-able outputs, one being coupled to said sum output and the other being coupled to said second sum output.

8. The arithmetic circuit of claim 7 wherein said second means further includes a second three-input NOR gate having first and second wire OR-able outputs coupled, respectively, to said sum output and said second sum output.

9. The arithmetic circuit of claim 8 wherein said first output of said first three-input NOR gate is wire ORed to the first output of said second three-input NOR gate.

10. The arithmetic circuit of claim 9 wherein the second output of said first three-input NOR gate is wire ORed to the second output of said second three-input NOR gate.

11. The arithmetic circuit of claim 10 wherein said first, second, third, fourth, two-input NOR gates, said first, second and third two-input OR/NOR gates, and said first and second three-input NOR gates are all emitter coupled logic gates.

12. The arithmetic circuit of claim 1 wherein said second means further includes means for producing a second sum output which is wire OR-able, whereby said second sum output is wire ORed with like second sum outputs of another arithmetic circuit to provide a zero result indicator signal.

13. An arithmetic and logic circuit having first and second arithmetic/logic inputs, a plurality of control inputs, and a carry in input and comprising:
   (a) first and second inverters responsive to first and second arithmetic/logic inputs, respectively, and each having first and second non-inverting outputs and third and fourth inverting outputs, the first, second, third, and fourth outputs of said first inverter being wire ORed with the first, third, second, and fourth outputs of said second inverter;
   (b) first, second, third, and fourth gates each being two-input gates and each having one input responsive to a respective one of the control inputs and another input responsive to the respective one of said first, second, third, and fourth outputs of said first inverter, the outputs of said first and second gates being wire ORed together, and the outputs of said third and fourth gates being wire ORed together;
   (c) a fifth gate having first and second inputs responsive to the outputs of said first and third gate, respectively;
   (d) a sixth gate having an input responsive to the output of said third gate;
   (e) a seventh gate having first, second, and third inputs responsive to the output of said first gate, the output of said sixth gate, and an output of a gate, said gate producing a carry signal, $\overline{\text{CARRY}}$, from said carry in input, respectively, and also having first and second non-inverting outputs; and
   (f) an eighth gate having first and third inputs responsive to the output of said fifth gate and an output of a gate, said gate producing a carry signal, $\overline{\text{CARRY}}$, from said carry in input, respectively, and having a first non-inverting output wire ORed with the first output of said seventh gate and a second non-inverting output wire ORed with the second output of said seventh gate.

14. The arithmetic and logic circuit of claim 13 wherein said first and second inverters and said first through said eighth gates are all emitter coupled logic gates.

15. The arithmetic and logic circuit of claim 13 further including an output disable input, wherein said sixth gate has a second input responsive to said output disable input.

16. The arithmetic and logic circuit of claim 15 wherein said eighth gate has a second input responsive to said output disable input.

17. The arithmetic and logic circuit of claim 16 further including a mode selection input for determining whether said arithmetic and logic circuit produces an arithmetic function or a Boolean logic function, and further including a ninth gate, said ninth gate being a two-input gate having one input connected to a carry in signal and another input connected to said mode selection input and having one output connected to third input of said seventh gate and other output connected to the third input of said eighth gate.

18. The arithmetic and logic circuit of claim 17 wherein said first, second, third, and fourth gates are all NOR gates, and wherein said fifth, sixth, and ninth gates are OR/NOR gates, and wherein said seventh and eighth gates are NOR gates.

19. The arithmetic and logic circuit of claim 18 further including tenth, eleventh, and twelfth gates, said tenth gate being a two-input OR gate, and said eleventh and twelfth being two-input OR/NOR gates, one input of said tenth gate being connected to the output of said first gate and a second input of said tenth gate connected to said mode selection input, said eleventh gate having one input connected to said carry in input and another input connected to the output of said tenth gate, said twelfth gate having one input connected to the inverting output of said sixth gate and another input connected to said mode selection input, the non-inverting outputs of said eleventh and twelfth gates being wire ORed together and the inverting outputs of said eleventh and twelfth gates being wire ANDed together to produce carry out and carry out complement signals.

20. The arithmetic and logic circuit of claim 19 further including a two-input OR gate having an output wire ORed to the output of said tenth gate, whereby additional carry look-ahead signals from other arithmetic and logic circuits are applied to the inputs of said two-input OR gate when a number of said arithmetic and logic circuits are connected together to form a multiple bit arithmetic and logic unit.

21. An arithmetic circuit having first and second arithmetic inputs, a plurality of control inputs, and a carry in input, said arithmetic circuit comprising:
(a) first and second inverting means responsive to the arithmetic inputs for producing a plurality of wire OR-able inverting outputs and non-inverting outputs;
(b) first, second, third, and fourth two-input NOR gates each having a first input responsive to a respective one of the control inputs and a second input responsive to respective ones of said outputs;
(c) first means responsive to the outputs of said first, second, third, and fourth two-input NOR gates for producing a propagate signal and a generate signal; and
(d) second means responsive to a carry in signal, said propagate signal, said generate signal, and the output of said first two-input NOR gate for producing a sum output.

* * * * *

UNITED STATES PATENT AND TRADEMARK OFFICE
CERTIFICATE OF CORRECTION

PATENT NO. : 4,160,290
DATED : July 3, 1979
INVENTOR(S) : Rolfe D. Armstrong

It is certified that error appears in the above-identified patent and that said Letters Patent are hereby corrected as shown below:

Column 10,
    Line 47, delete "CARRY" and insert therefor
          -- CARRY --.

Signed and Sealed this

Ninth Day of *October 1979*

[SEAL]

Attest:

RUTH C. MASON
*Attesting Officer*

LUTRELLE F. PARKER
*Acting Commissioner of Patents and Trademarks*